(12) United States Patent
Broad et al.

(10) Patent No.: US 9,057,821 B2
(45) Date of Patent: Jun. 16, 2015

(54) METHOD OF MAKING A CONTACT LENS

(75) Inventors: Robert Andrew Broad, Hampshire (GB); Ian Gibson, Southampton (GB)

(73) Assignee: Sauflon CL Limited, Fareham Hampshire (GB)

( * ) Notice: Subject to any disclaimer, the term of this patent is extended or adjusted under 35 U.S.C. 154(b) by 614 days.

(21) Appl. No.: 13/497,097

(22) PCT Filed: Oct. 12, 2010

(86) PCT No.: PCT/EP2010/065248
§ 371 (c)(1),
(2), (4) Date: Mar. 20, 2012

(87) PCT Pub. No.: WO2011/045299
PCT Pub. Date: Apr. 21, 2011

(65) Prior Publication Data
US 2012/0184696 A1  Jul. 19, 2012

(30) Foreign Application Priority Data

Oct. 12, 2009  (GB) .................................. 0917806.2

(51) Int. Cl.
| | | |
|---|---|---|
| C08B 1/04 | (2006.01) |
| G02B 1/04 | (2006.01) |
| C08F 220/56 | (2006.01) |
| C08F 226/10 | (2006.01) |
| C08F 230/08 | (2006.01) |
| C08G 77/20 | (2006.01) |
| C08G 77/24 | (2006.01) |

(52) U.S. Cl.
CPC ............... *G02B 1/043* (2013.01); *C08F 220/56* (2013.01); *C08F 226/10* (2013.01); *C08F 230/08* (2013.01); *C08G 77/20* (2013.01); *C08G 77/24* (2013.01)

(58) Field of Classification Search
USPC .................................................. 526/264, 245
See application file for complete search history.

(56) References Cited

U.S. PATENT DOCUMENTS

| 5,093,447 A | 3/1992 | Novicky |
| 5,260,000 A * | 11/1993 | Nandu et al. .................... 264/2.1 |
| 5,321,108 A | 6/1994 | Kunzler et al. |
| 2007/0270561 A1 | 11/2007 | Kunzler et al. |
| 2008/0269429 A1 * | 10/2008 | Arkles et al. .................. 525/477 |

FOREIGN PATENT DOCUMENTS

| EP | 1985645 | 10/2008 |
| JP | H04370122 | 12/1992 |
| JP | H08506841 | 7/1996 |
| JP | 2008274278 | 11/2008 |
| WO | 2006/026474 | 3/2006 |
| WO | 2008/061992 | 5/2008 |

* cited by examiner

*Primary Examiner* — Ling Choi
*Assistant Examiner* — Chun-Cheng Wang
(74) *Attorney, Agent, or Firm* — McDonnell Boehnen Hulbert & Berghoff LLP

(57) ABSTRACT

A method of making a contact lens comprising the steps of reacting in a mold a polymerizable formulation comprising at least one fluorine-containing silicone monomer at least one non-fluorine-containing silicone monomer and at least one hydrophilic monomer to form a contact lens, subjecting the contact lens to one or more solvent extraction steps to remove impurities, oligomers and unreacted monomers and hydrate the contact lens, wherein all of the solvent extraction steps are undertaken using an aqueous solvent.

16 Claims, No Drawings

METHOD OF MAKING A CONTACT LENS

CROSS REFERENCE TO RELATED APPLICATIONS

The present application is a 35 U.S.C. 371 National Application of PCT/EP2010/065248, filed Oct. 12, 2010, which claims priority to Great Britain Patent Application No. GB 0917806.2, filed Oct. 12, 2009.

The present invention relates to methods of making contact lenses and polymerisable compositions suitable in such methods.

Since the invention of rigid gas permeable contact lens materials containing silicone monomers and polyfluorinated monomers in the 1970's, it has been the goal of researchers in the field to improve the oxygen permeability of soft, hydrophilic contact lens materials using similar technology. In order to substantially improve the oxygen permeability of hydrophilic formulations, a popular solution has been to add significant quantities of hydrophobic monomers containing silicone, fluorine, or fluorosilicone functionality, either individually or in combination, to formulations containing hydrophilic monomers. The compatibility of these hydrophobic monomers with the hydrophilic monomers is typically poor, leading to phase separation and opaque materials, which are less than ideal for applications such as in contact lenses, where the optically transparency of the material is critical. Therefore the increase in the oxygen permeability, or Dk, which may be achieved by adding the hydrophobic materials described, can significantly compromise other critical properties of the lens materials.

The difficulties in balancing all of the properties required for successful contact lens materials with the use of substantial amounts of hydrophobic silicone, fluorinated or fluorosilicone compounds to improve the oxygen permeability are significant, as the mechanisms for controlling the different properties of the final material are frequently antithetical, making the simultaneous optimisation of all properties very difficult. Silicone hydrogel contact lens materials are therefore by necessity a compromise solution, where the improvement of one material property by changing the formulation or processing conditions can adversely affect another property. The level of difficulty in achieving the required balance of properties may be demonstrated by the time elapsed between the earliest patents describing solutions to the compatibility problem such as U.S. Pat. No. 4,139,513 in 1979 and the appearance of the first commercially successful silicone hydrogel products made by Bausch and Lomb (Purevision™) and Cibavision (Focus Night and Day™) in the mid to late 1990's, nearly 20 years later.

Even if the materials can be formulated to be optically transparent, micro-phase separation at the molecular level can lead to detrimental effects on such properties as lens wettability and surface friction, and the inclusion of high levels of hydrophobic materials can lead to increased modulus (stiffness), poor product stability and poor biocompatibility including increased lipid and protein deposition. It is therefore desirable to produce silicone hydrogels with increased Dk which are non-phase separated and optically transparent, and which retain the many other properties critical for successful use as contact lens materials. "Phase separated" refers to a heterogeneous material with two or more distinct phases within one material, such phases having distinctly different chemical compositions.

A commonly used solution to the problem of the poor compatibility of the hydrophobic silicone containing materials and the hydrophilic monomers to reduce the micro-phase separation has been to use non-reactive compatibilising agents such as solvents or diluents. These solvents or diluents are added to the formulation prior to the final curing process, and do not form part of the final polymer. Once the lenses are cast, the removal of these non-reactive solvents or diluents is typically done by extraction with organic solvents, which is a complex and involved process, examples of which are described in EP1752166 and EP1982825. WO2004/081105 discloses the use of specific diluents for improving the compatibility of the silicone components with the hydrophilic components, which must then be extracted from the cured polymer using three exchanges of solvent/water mixture (70/30 IPA/$H_2O$ vol/vol). Such processes add complexity to the manufacturing process and add cost both directly and indirectly; the capital costs, building costs and insurance costs of installing and running processes using potentially hazardous flammable organic solvents are significant. The environmental factors, which must also be considered, are increasingly important and the costs of disposing of or recycling organic solvent waste chemicals continue to rise.

The use of exclusively aqueous extraction is not anticipated by the disclosures referenced above. However WO2008/054667 does describe a method for manufacturing contact lenses using solvents with selected Hanson solubility parameters such that the resultant lenses can be extracted using an aqueous solution only. Although this latter document describes the use of aqueous solutions for extraction of contact lens polymers, it does not circumvent the requirement for a solvent in the formulation, again leading to increased cost and manufacturing complexity due to the use of volatile organic solvents at the lens casting stage, the use of which are not preferred in a modern manufacturing environment.

A further issue with silicone based hydrogels which must be addressed by an effective hydration and extraction process is that low levels of compounds which are poorly soluble in water may be present in the cured materials. These poorly water soluble compounds may include but are not limited to impurities, oligomers, and un-reacted monomers, together with residual solvents or diluents, and are difficult to remove effectively using aqueous extraction processes. These impurities, compounds or un-reacted monomers, solvents and diluents can leach into the tear film and can cause discomfort or, in extreme cases stinging when the lenses are placed on eye. This is clearly disadvantageous for patient comfort and must be avoided. Without being bound by theory, it is believed that these compounds can, for example, be amphiphilic in nature, and are present in extremely low concentrations making their identification extremely difficult using standard analytical methods. A further difficulty is that compounds which may cause stinging or discomfort on-eye may not necessarily be indicated as cytotoxic by the screening methods currently available, either because the methods do not have the required sensitivity to low levels of these compounds, or that the mechanism for cytotoxicity and stinging are disparate. This makes the development of effective in vitro screening methods challenging.

Processes for carrying out aqueous hydration of silicone hydrogels taking account of these issues have been disclosed including US2007/0231292 which describes the use of additives which act as leaching aids to facilitate the removal of the undesired residual solvents and impurities from the material. WO2007/111973 describes the aqueous extraction of solvent based formulations to remove the residual solvents and sparingly water soluble compounds which is achieved at least in part at elevated temperatures. This disclosure does not circumvent the use of a solvent during the lens casting process, nor does it anticipate the use of solvent-free formulations with an exclusively aqueous extraction and hydration process.

The use of fluorinated monomers either on their own or in conjunction with silicone monomers for producing rigid lenses (RGP's) with the desired oxygen permeability is well documented, for example WO93/23773, and workers have sought to utilise this RGP technology to produce hydrogel polymers containing either or both silicone monomers and fluorinated monomers in combination with hydrophilic monomers. U.S. Pat. No. 6,649,722 (Rosenzweig et al) describes formulations containing silicone monomers and macromers combined with hydrophilic monomers, TRIS and fluorinated molecules of varying molecular weight. Work by Lee et al (J Mat Chem 2000 10, 859-865) using sulphonamide containing monomers similar to those used by Rosenzweig in the absence of silicone containing monomers claim useful hydrogels. However the oxygen permeability reported for these materials are significantly lower than those required to produce useful lenses.

Alternatives have been proposed which include fluorinated molecules combined with hydrophilic monomers in the absence of silicone containing monomers or macromers. U.S. Pat. No. 5,011,275 (Mueller et al) describes materials which are claimed to have the desired mechanical properties. However the oxygen permeability of these materials are typically poor when compared to silicone-containing polymers.

An alternative approach is to incorporate the fluorine moiety in a group covalently attached to the silicone containing molecules either as a side chain or as an end group. In U.S. Pat. No. 5,321,108 and U.S. Pat. No. 5,908,906 (Kunzler et al) it is reported that by using this approach higher molecular weight molecules can be incorporated into silicone hydrogels, and that the relative softness or hardness of the contact lenses produced can be varied by increasing or decreasing the molecular weight of these components. These patents also report that the compatibility and solubility of fluorinated siloxanes in hydrophilic comonomers is substantially improved to the point where additional solubilising or compatibilising agents are not required, although both include the step of extracting the resulting polymers with solvent prior to placing into an aqueous system. The authors take a similar approach in both U.S. Pat. No. 5,959,117 and EP1196499 wherein the alternative fluorine-containing macromers described may be either mono-functional or bi-functional, and again, in both cases, the polymers are extracted with organic solvent and then boiling water before being equilibrated in buffered saline.

EP1985645 describes a series of siloxane macromonomers having one polymerizable functional group. One of the monomers disclosed is monomethacryloxypropyl terminated polytrifluoropropylmethylsiloxane.

U.S. Pat. No. 5,321,108 describes the use of fluorinated side chain to a polysiloxane containing monomer to improve the compatibility of the silicone containing monomers to the hydrophilic monomers. The inclusion of a hydrogen atom attached to the terminal di-fluorinated carbon atom of a fluorinated side chain is stated to improve the compatibility of these monomers with hydrophilic monomers. Fully fluorinated side chains are stated to be insoluble in the hydrophilic monomers. Polymer films of the invention were extracted with 2-propanol overnight and then boiled in buffered saline.

Therefore these documents disclose methods for avoiding the use of solvents in the lens casting process by the incorporation of fluorinated moieties. However they do not circumvent the need for expensive, hazardous and complex extraction processes with organic solvents.

There remains a requirement, therefore, to produce cast moulded silicone hydrogel lenses or other biomedical and ophthalmic devices in high volume with a combination of a solvent-free formulation together with the capability to hydrate and extract impurities from the lenses using a fully and exclusively aqueous system, wherein the lenses retain all of the required properties for a successful contact lens material. It has been found that surprisingly this can be achieved by careful selection of the components of the formulation and optimisation of the processing conditions.

The term "ophthalmic device" refers to a device which is designed to be placed within the ocular environment. This includes but is not limited to soft contact lenses, hard contact lenses, scleral lenses, intraocular lenses. The present invention also relates to other biomedical devices such as hydrogels for wound dressings, drug delivery or other prostheses.

Accordingly, in a first aspect of the present invention, there is provided a method of making a contact lens comprising the steps of:
a) reacting in a mould a polymerisable formulation comprising:
(i) at least one fluorine-containing silicone monomer having the formula

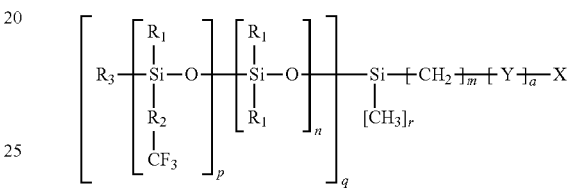

where X is a polymerisable group, each $R_1$ is independently a $C_{1-6}$ alkyl group or an $R_4$—$CF_3$ group, wherein $R_4$ is independently a $C_{1-6}$ alkenyl group, each $R_2$ is independently a $C_{1-6}$ alkenyl group, or a fluorine-containing $C_{1-6}$ alkenyl group, $R_3$ is a monovalent linear or branched alkyl group, a siloxane chain comprising from 1 to 30 Si—O units, a phenyl group, a benzyl group, a linear or branched heteroatom containing group or a combination thereof, m is 1 to 6, n is 0 to 14, and p is 1 to 14, and n+p is •15, Y is a divalent linking group and a is 0 or 1, and wherein q is 1 to 3, r is 3−q;
(ii) at least one non-fluorine-containing silicone monomer and
(iii) at least one hydrophilic monomer
to form a contact lens
b) subjecting the contact lens to one or more solvent extraction steps to remove impurities, oligomers and unreacted monomers and hydrate the contact lens, wherein all of the solvent extraction steps are undertaken using an aqueous solvent. Preferably the fluorine-containing silicone monomer has a value of q of from 1 to 2. More preferably, the fluorine-containing silicone monomer has the structure

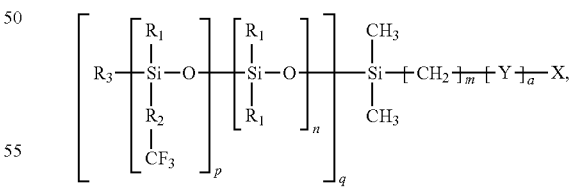

where X is a polymerisable group, each $R_1$ is independently a $C_{1-6}$ alkyl group or an $R_4$—$CF_3$ group, wherein $R_4$ is independently a $C_{1-6}$ alkenyl group, each $R_2$ is independently a $C_{1-6}$ alkenyl group, or a fluorine-containing $C_{1-6}$ alkenyl group, $R_3$ is a monovalent linear or branched alkyl group, a siloxane chain comprising from 1 to 30 Si—O units, a phenyl group, a benzyl group, a linear or branched heteroatom containing group or a combination thereof, m is 1 to 6, n is 0 to 14, and p is 1 to 14, and n+p is •15, Y is a divalent linking group and a is 0 or 1.

According to the present invention, the siloxane chain is a straight or branched chain comprising from 1 to 30 Si—O units. The siloxane chain is preferably terminated with an alkyl group, more preferably a methyl group, but could be terminated with any one of the alternate $R_3$ definitions. A heteroatom containing group is a monovalent or divalent organic radical, which may or may not be cyclic, and which contains at least one heteroatom where a hetero atom is any atom other than carbon or hydrogen. Particularly preferred $R_3$ groups are alkyl groups or siloxane chains, with alkyl groups being especially preferred.

According to the present invention, an aqueous solvent is one which comprises at least 51% of water, preferably at least 75% water, more preferably at least 90% water, even more preferably at least 95% water. It is particularly preferred that the aqueous solvent is 100% of water or buffered saline solution.

Extraction and hydration or "E&H" of a contact lens is a term well known in the art. E&H involves exposing a cured material to a solvent or series of solvents, including aqueous solutions, organic solvents or mixtures of the organic solvents in water, which may either swell the lens, or replace the existing solvent in the lens or both. The extraction and hydration process facilitates removal of impurities, oligomers, and unreacted monomers, and residual solvents or diluents if present (which collectively, individually or in any combination may be referred to as leachables) which may detrimentally affect the ocular compatibility and therefore the in vivo performance of the material prior to the device being placed in the final packaging solution. The use of organic solvents in the extraction and hydration process is standard in the field of contact lenses. However, it is undesirable to include organic solvents in this process as the extraction process is necessarily expensive, complex and hazardous.

It is preferable that the extraction steps comprise the use of standard buffered saline formulations familiar to those skilled in the art or purified water, including but not limited to de-ionised or distilled water without the need for additional leaching agents. A leaching agent is an additive to the extraction and hydration process which facilitates the removal of leachables from the material, for example, but without limitation, those described in US application 2007/0231292.

It is yet another preferred embodiment of the invention that the extraction and hydration process is carried out at close to ambient temperatures without the need for special additives in the extraction solution to facilitate solvation of the leachables or special additional heating devices. The temperature range is preferably from 15 to 25° C.

In a second aspect of the present invention, there is provided a solvent-free polymerisable formulation, the formulation comprising:
(i) at least one fluorine-containing silicone monomer having the formula

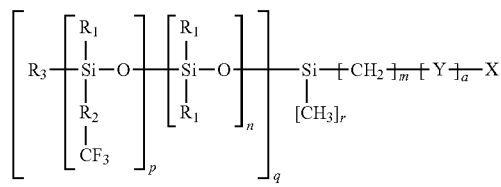

where X is a polymerisable group, each $R_1$ is independently a $C_{1-6}$ alkyl group or an $R_4$—$CF_3$ group, wherein $R_4$ is independently a $C_{1-6}$ alkenyl group, each $R_2$ is independently a $C_{1-6}$ alkenyl group, or a fluorine-containing $C_{1-6}$ alkenyl group, $R_3$ is a monovalent linear or branched alkyl group, a siloxane chain comprising from 1 to 30 Si—O units, a phenyl group, a benzyl group, a linear or branched heteroatom containing group or a combination thereof, m is 1 to 6, n is 0 to 14, and p is 1 to 14, and n+p is •15, Y is a divalent linking group and a is 0 or 1, wherein q is from 1 to 3 and r is 3−q;
(ii) at least one non-fluorine-containing silicone monomer; and
(iii) at least one hydrophilic monomer
wherein the total amount of component (i) is at least 20 weight percent of the total formulation and the total amount of components (i) and (ii) is less than 50 weight percent of the total formulation. By solvent free, it is intended that the formulation contains less than 10% by weight of an organic solvent which does not form part of the polymeric composition, more preferably less than 5% of an organic solvent, even more preferably less than 2% of an organic solvent, and most preferably 0% of an organic solvent.

In a third aspect of the present invention, there is provided a polymerisable formulation comprising:
(i) from 20 to 35 weight percent of at least one fluorine-containing silicone monomer having the formula:

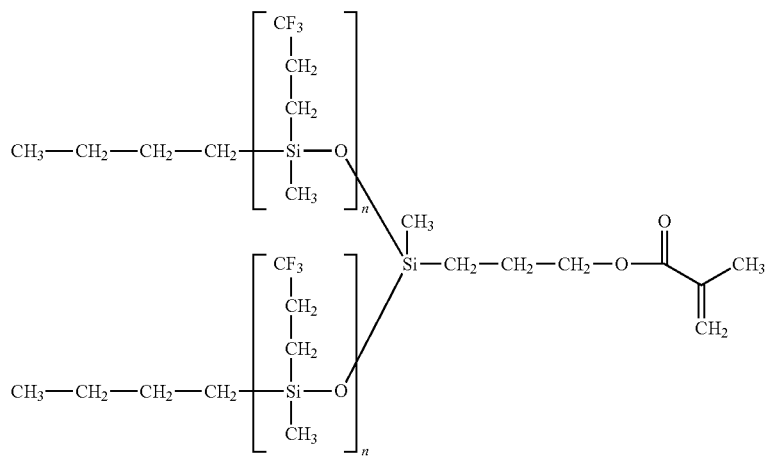

wherein each n is independently from 1 to 10;

(ii) from 8 to 35 weight percent of at least one non-fluorine containing silicone monomer;
(iii) from 25 to 60 weight percent N-vinyl pyrrolidone or N-vinyl acetamide;
(iv) from 2 to 10 weight percent 2-hydroxyethyl methacrylate,
wherein the total amount of components (i) and (ii) is less than 55 weight percent.

In a fourth aspect of the present invention, there is provided a polymerisable formulation comprising:
(i) from 20 to 35 weight percent of at least one fluorine-containing silicone monomer having the formula:

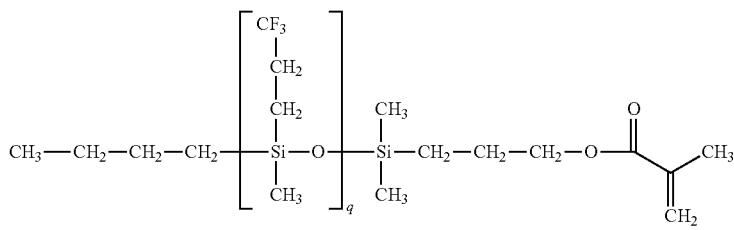

wherein n is from 1 to 10;
(ii) from 15 to 35 weight percent of at least one non-fluorine containing silicone monomer;
(iii) from 25 to 60 weight percent N-vinyl pyrrolidone or N-vinyl acetamide;
(iv) from 2 to 10 weight percent 2-hydroxyethyl methacrylate,
wherein the total amount of components (i) and (ii) is less than 50 weight percent.

The compositions of the second, third and fourth aspects of the present invention are particularly suitable for making contact lenses using aqueous extraction and hydration.

The fluorinated polymerisable material used in the present invention has the structure I:

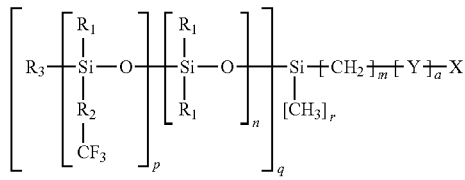

Formula I where X is a polymerisable group, each $R_1$ is independently a $C_{1-6}$ alkyl group or an $R_4$—$CF_3$ group, wherein $R_4$ is independently a $C_{1-6}$ alkenyl group, each $R_2$ is independently a $C_{1-6}$ alkenyl group, or a fluorine-containing $C_{1-6}$ alkenyl group, $R_3$ is a monovalent linear or branched alkyl group, a siloxane chain comprising from 1 to 30 Si—O units, a phenyl group, a benzyl group, a linear or branched heteroatom containing group or a combination thereof, m is 1 to 6, n is 0 to 14, p is 1 to 14, and n+p is •15, Y is a divalent linking group and a is 0 or 1, wherein q is from 1 to 3 and r is 3-q.

Preferably q is 1 or 2 and more preferably q is 1.
Preferably n is 0 to 1, more preferably 0 to 7. Preferably p is 1 to 10, more preferably 3 to 7.
Preferably $R_1$ in each case is an alkyl group, and more preferably a methyl group.

In a further preferred embodiment m is 2 to 4. In another preferred embodiment, a is 0.

Preferred $R_3$ groups are $C_1$ to $C_8$ alkyl groups and siloxane chains having from 1 to 30 Si—O units. Particularly preferred are $C_1$ to $C_8$ alkyl groups, and in particular n-alkyl groups.

Suitable polymerisable groups are known to the skilled person. Preferred groups are acrylates, methacrylates, acrylamides, methacrylamides, vinyl groups or other unsaturated or reactive groups Preferred monomers include those of formula II

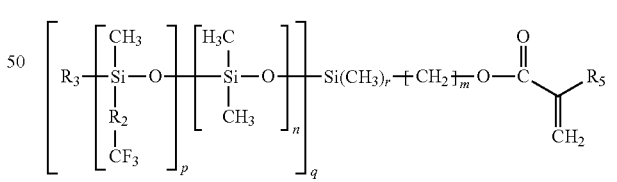

Formula II wherein each $R_2$ is independently a $C_{1-6}$ alkenyl group, or a fluorine-containing $C_{1-6}$ alkenyl group, $R_3$ is a monovalent alkyl group, $R_5$ is H or $CH_3$, m is 1 to 6, n is 0 to 14, and p is 1 to 14, and n+p is •15, q is from 1 to 3 and r is 3-q. It is preferred that q is 1 or 2, with q=1 being particularly preferred.

It is particularly preferred to use a monomer of Formula III

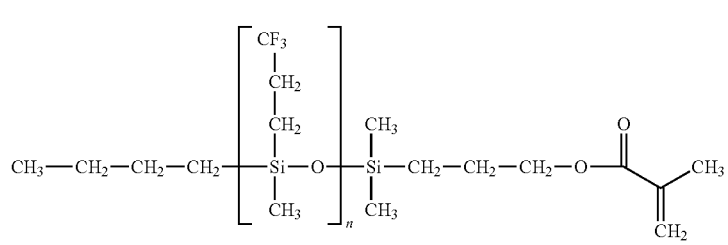

Formula II wherein n is from 1 to 10.

It is also particularly preferred to use a monomer of Formula IV

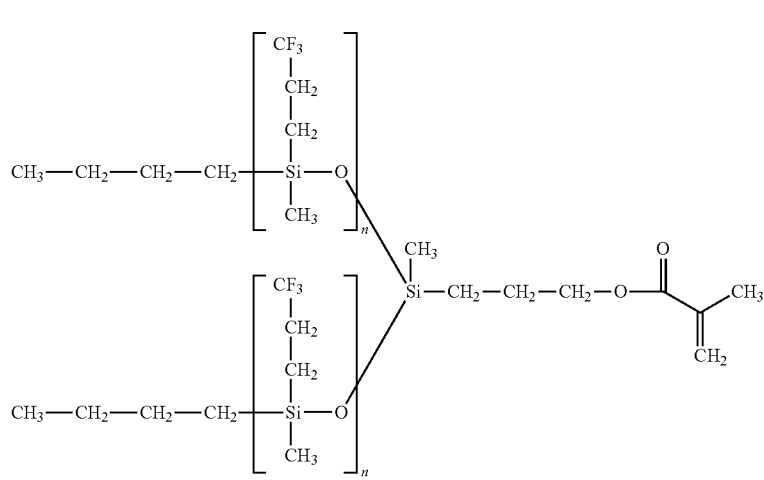

Formula IV wherein each n is individually from 1 to 10.

The fluorinated polymerisable material is preferably present in an amount of at least 5 weight percent, more preferably at least 10 weight percent and most preferably at least 20 weight percent. The fluorinated polymerisable material is preferably present in an amount of less than 50 weight percent, more preferably less than 40 weight percent and most preferably less than 35 weight percent.

The composition comprises a hydrophobic non-fluorine containing silicone monomer. Preferably, the silicon containing monomer is selected from tris(trimethylsilyloxy)silylpropyl methacrylate (TRIS), 3-methacryloxypropyldimethyl siloxanes (MAPDMS), 3-methacryloxy propylpentamethyldisiloxane, bis(methacryloxypropyl)tetramethyldisiloxane, N[tris(trimethylsiloxy) silylpropyl]methacrylamide(TSMAA), N[tris(trimethylsiloxy)silylpropyl]acrylamide, N[tris (trimethylsiloxy) silylpropyl]methacryloxyethylcarbamate, N[tris(dimethylpropylsiloxy) silylpropyl]methacrylamide, N[tris(dimethylphenylsiloxy)silylpropyl]methacrylamide, N[tris(trimethylsiloxy)silylpropyl]methacryloxyglycerylcarbamate, N[tris(dimethylethylsiloxy)silylpropyl]methacrylamide, N[tris(trimethylsiloxy)silylpropyl]methacryloxyacetamide, and N[tris(trimethylsiloxy)silylpropyl] methacryloxymethyl dimethylacetamide or mixtures thereof. "Hydrophobic", as used herein, refers to a material or portion thereof which is repelled by water, and is typified by being non-polar in nature.

Especially preferred is tris(trimethylsilyloxy)silylpropyl methacrylate (TRIS).

Other silicone monomers which may be utilised in the formulations are functionalised polydimethylsiloxane macromers. Such materials may be monofunctional, or have two or more polymerisable groups. These materials may be represented by general formula V

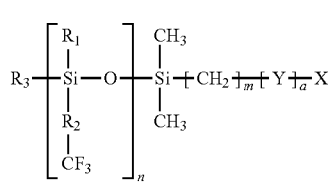

Formula V where X is a polymerisable group, Each $R_1$ is independently a $C_1$ to $C_{10}$ alkyl group, $R_3$ is a monovalent linear or branched alkyl group, a siloxane chain comprising from 1 to 30 Si—O units, a phenyl group, a benzyl group, a linear or branched heteroatom containing group or a combination thereof or a polymerisable group, m is 1 to 6, n is 1 to 30, and Y is a divalent linking group and a is 0 or 1. Examples of this group of materials are shown in the formulae below where n is 1 to 30 and a is 1 to 10.

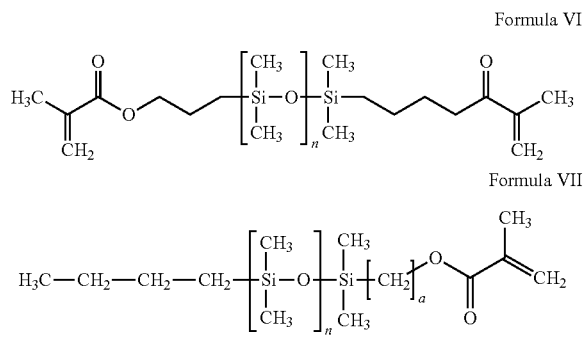

The non-fluorine containing silicone monomers are preferably present in an amount of from 5 to 40 weight percent, preferably from 5 to 30 weight percent and more preferably from 5 to 25 weight percent.

It is preferred that the total amount of silicone monomers, including both fluorine containing and non-fluorine containing silicone monomers is less than 60 weight percent and more preferably less than 50 weight percent. The total amount of silicone monomers is preferably greater than 10 weight percent and more preferably greater than 20 weight percent.

The composition of the present invention comprises at least one hydrophilic monomer. The hydrophilic monomers are preferably present in a total amount of less than 80 weight percent and more preferably less than 60 weight percent. The hydrophilic monomers are preferably present in a total amount of at least 30 weight percent, and more preferably at least 40 weight percent.

Examples of suitable hydrophilic monomers include hydroxyl substituted $C_{1-6}$ alkyl acrylates and methacrylates, for example 2-hydroxy ethyl methacrylate, (meth)acrylamide, ($C_{1-6}$ alkyl)acrylamides and -methacrylamides, for example N,N-dimethylacrylamide, ethoxylated acrylates and methacrylates, hydroxylsubstituted ($C_{1-6}$ alkyl)acrylamides and -methacrylamides, hydroxyl-substituted $C_{1-6}$ alkyl vinyl ethers, sodium vinylsulfonate, sodium styrenesulfonate, vinyl containing monomers for example N-vinylpyrrole, N-vinyl-2-pyrrolidone, 2-vinyloxazoline, 2-vinyl-4,4'-dialkyloxazolin-5-one, 2- and 4-vinylpyridine, N-methyl-N-vinyl-acetamide, vinylically unsaturated carboxylic acids having a total of 3 to 5 carbon atoms, for example methacrylic acid, amino($C_{1-6}$ alkyl)-(where the term "amino" also includes quaternary ammonium), dimethylaminoethyl methacrylate (DMAEMA), mono($C_{1-6}$ alkylamino)($C_{1-6}$ alkyl) and di($C_{1-6}$ alkylamino)($C_{1-6}$ alkyl)acrylates and methacrylates, allyl alcohol, and zwitterionic monomers including sulphobetaines and carboxybetaines. "Hydrophilic", as used herein, describes a material or portion thereof which can transiently bond to water through hydrogen bonding. A hydrophilic monomer is one which can combine with other monomers to form a polymer that has hydrophilic properties or can impart such properties to the final polymer. Molecules with hydrophilic properties have an affinity to water and are typically charged or have polar side groups to their structure that will attract water by the formation of transient hydrogen bonds.

Preferably, the hydrophilic monomers are selected from the group N-vinyl-2-pyrrolidone, N,N-alkylacrylamides, and hydroxylsubstituted $C_{1-6}$ alkyl acrylates and methacrylates or mixtures thereof. The preferred hydrophilic comonomer is N-vinyl pyrrolidone. N-vinyl pyrrolidone is preferably used in an amount of from 40 to 60 weight percent. In addition to N-vinyl pyrrolidone, at least one other non-ionic hydrophilic monomer is preferably used. In one preferred embodiment, the composition comprises 2-hydroxyethyl methacrylate, N,N-dimethylacrylamide and at least one of N-vinyl pyrrolidone and N-methyl-N-vinyl acetamide.

In one preferred embodiment, the composition additionally comprises a non-silicon containing hydrophobic monomer. Examples of suitable hydrophobic co-monomers include methyl acrylate, ethyl acrylate, propyl acrylate, isopropyl acrylate, cyclohexyl acrylate, 2-ethylhexyl acrylate, methyl methacrylate, ethyl methacrylate, propyl methacrylate, butyl acrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyltoluene, vinyl ethyl ether, perfluorohexylethylthiocarbonylaminoethyl methacrylate, isobornyl methacrylate, trifluoroethyl methacrylate, hexafluoroisopropyl methacrylate, tetrafluoropropyl methacrylate, hexafluorobutyl methacrylate. "Hydrophobic", as used herein, refers to a material or portion thereof which is repelled by water, and is typified by being non-polar in nature. The non-silicon containing hydrophobic monomer is preferably present in an amount of from 0 to 30 weight percent, and preferably from 0 to 20 weight percent.

The composition also preferably comprises a cross-linker, which are typified in having more than one polymerisable reactive group per molecule. Examples of cross-linkers include allyl (meth)acrylate, $C_{2-6}$ alkylene glycol di(meth)acrylate, examples include ethylene glycol dimethacrylate and tetraethyleneglycol dimethacrylate, poly($C_{2-6}$ alkylene) glycol di (meth)acrylate, divinyl ether, divinyl sulfone, di- and trivinylbenzene, trimethylolpropane tri(meth)acrylate, pentaerythritol tetra(meth)acrylate, bisphenol A di(meth)acrylate, triallyl cyanuronate, methylenebis(meth)acrylamide, triallyl phthalate and diallyl phthalate.

Silicone containing dimers may also be used as cross linking agents. Examples include 1,3-Bis(methacrylamidopropyl)-1,1,3,3-tetrakis(trimethylsiloxy)disiloxane, 1,3-Bis(N-methylmethacrylamidopropyl)-1,1,3,3-tetrakis (trimethylsiloxy)disiloxane, 1,3-Bis (methacrylamidopropyl)-1,1,3,3-tetrakis(trimethylsiloxy) disiloxane, 1,3-Bis(acrylamidopropyl)-1,1,3,3-tetrakis (trimethylsiloxy)disiloxane, 1,3-Bis (methacryloxyethylureidopropyl)-1,1,3,3-tetrakis (trimethylsiloxy) disiloxane.

The preferred cross linking agent is tetraethyleneglycol dimethacrylate ("TEGDMA").

Preferred amounts of cross-linker are from 0.1 to 5 weight percent, and more preferably from 0.1 to 2 weight percent.

Standard UV absorbers and/or colorants may be added to the monomer mix using methods known to those skilled in the art.

As used herein, the weight percent refers to the weight percent of all of the monomers in the reaction mixture in the absence of any solvent.

The compositions of the present invention are preferably produced from a monomer mixture which is solvent free. However, compositions according to the present invention can be produced from a monomer mixture which contains some solvent. Suitable solvents include straight chain or branched primary alcohols, for example ethanol or propanol, secondary or tertiary alcohols for example isopropanol and ethyl acetate. Where a solvent is used, it is preferably present in an amount of less than 20% by weight of the formulation, more preferably less than 10% by weight of the formulation.

Preferably, the monomer mixture is pre-shaped prior to curing so that upon curing, an article of pre-defined shape is formed. Pre-shaping is conveniently achieved by casting the monomer mixture between mating male and female mould halves. Lenses of the present invention may be cast using any of the known processes for forming lenses. Suitable cast moulding processes are described for example in EP1597056, EP0383425, U.S. Pat. No. 4,955,580 and U.S. Pat. No. 4,113,224. Spin casting methods are also known and examples of this technology are disclosed in U.S. Pat. No. 3,660,545. Processes have also been described for direct moulding of lenses, which can utilise for example re-usable quartz moulds and polymerising the lens mixture. Polymerisation may be carried out using either thermally, actinically using UV or visible light, by e-beam radiation, or other energy source known to those skilled in the art. Solvent free formulations may also be cast as rods or buttons and lenses subsequently manufactured using lathing methods familiar to those skilled in the art.

Examples of suitable polymerisation initiators or catalysts which are well understood in the art include azo or peroxide containing compounds such as benzoyl peroxide, lauroyl peroxide, di-isopropyl-peroxy dicarbonate, azo bis(2,4-dimethyl valeronitrile), azo bis (isobutyronitrile), redox systems, for example ammonium persulphate, and photoinitiators which are effective in either the UV spectrum or the visible light spectrum or a combination of these, including for example benzoin methyl ether or phosphine oxides, for example biphenyl(2,4-trimethylbenzoyl)phosphine oxide.

Preferably the cure is conducted thermally in an atmosphere containing less than 150 ppm of oxygen and more preferably less than 100 ppm of oxygen.

More preferably the cure is conducted thermally in an inert atmosphere such as nitrogen or noble gas containing less than 50 ppm of oxygen.

Preferably, the method results in a contact lens possessing, but not limited by, the properties below.

The modulus is preferably less than 1.2 Mpa, more preferably the modulus is lower than 0.6 Mpa and most preferably the modulus is less than 0.4 Mpa.

The oxygen permeability of the material is preferably at least 50 barrers, and more preferably is greater than 60 barrers. The oxygen permeability, or Dk, is the rate at which oxygen passes through a material, and is independent of thickness. Oxygen permeability or Dk is typically expressed in units of barrers, which is defined as:
$(mlO_2)cm^2\ ml^{-1}\ s^{-1}\ mmHg^{-1} \times 10^{-11}$.

Preferably, the resultant contact lens is ophthalmologically compatible.

"Ophthalmologically compatible" refers to a material which may be in direct contact with the ocular environment without causing significant changes to the ocular environment, is toxicologically inert, and without causing user discomfort for both the period of contact and following removal. This term also refers to the properties of the lens material such that the deposition of protein, lipid or other bio-molecules intrinsic to the ocular environment is limited to a level such that the performance of the device is not compromised, and that following the period of contact the device is easily removed.

Preferably, the bulk water content of the contact lens is in the range of 20 to 75%, more typically 35 to 60%

A centre thickness for a fully hydrated contact lens is preferably more than 30 microns and less than 300 microns. More preferably, the lens centre thickness is between 50 to 150 microns. Most preferably, the lens centre thickness is between 50 and 100 microns.

Unless otherwise stated the terms used herein such as monomer, macromer, polymer, pre-polymer, oligomer, polymerisation, co-polymerisation, homo-polymer, and co-polymer shall be construed to have the standard IUPAC definition and shall be interpreted in this way. A polymerisable material is a material which is capable of incorporation into a larger molecule or polymer via covalent bonding. This may include, but is not limited to, monomers, oligomers, macromers, pre-polymers, or polymers.

Any one of the preferred embodiments of the present invention can be combined with any one of the other preferred embodiments.

Preferred embodiments of the invention will be described by the below Examples.

EXAMPLES 1 TO 32

Contact lenses were made by reacting various monomer mixtures having the compositions shown in Tables 2 to 5, 7 and 8.

The reactants and if included the solvent were mixed at room temperature to produce a curable mixture. The mixtures were placed in an injection moulded polypropylene contact lens mould, and thermally cured in a bespoke design Gallenkamp oven modified to operate with an inert atmosphere. Prior to the start of the cure, ovens were purged with nitrogen at a flow rate of 20 liters per minute for one hour to reduce the oxygen concentration within the oven chamber. During cure the flow rate is reduced to between 1 and 2 liters per minute to keep a slight positive pressure of nitrogen. The oxygen concentration during cure is substantially lower than 100 ppm, and preferably less than 50 ppm. It will be known to those skilled in the art that the oxygen concentration during cure is an important parameter and that this must be controlled and maintained. Lenses were typically cured using a two stage cure profile, with a lower temperature first temperature plateau followed by a higher temperature second stage temperature plateau.

Curing profiles for materials of this type will be well understood by those skilled in the art, and can vary from single plateau cures with durations of one or two hours at temperatures of around 100° C. to two stage cures where the first plateau may be as low as 30° C. and have a duration of many hours, with the second plateau temperature typically being designed to be above the glass transition temperature (Tg) of the cured polymer, typically greater than 100° C.

The lenses were typically measured or assessed for a number of different characteristics, including physical measurement parameters such as dry and wet centre thickness, diameter, base curve, water content, wettability, Dk, and mechanical properties, and also subjective parameters such as haze and ease of removal of the lenses from the mould.

Removal from moulds was assessed on a scale of 1 to 5, with 1 being very easy to remove from the mould, and a score of 5 indicating that the lenses were firmly adhered to the moulds and could not be removed. For this reason examples with a score of 5 for de-moulding do not have any other measurement parameters recorded.

Lenses were hydrated, placed in vials or blisters in borate buffered saline, sterilised in an autoclave and equilibrated for at least 2 hours at 21° C.+/−1° prior to measurement. Where appropriate, equipment was calibrated prior to use.

Dry centre thickness is measured with a Mitutoyo Digimatic Indicator model 1D110-ME fitted to a model DGS-E stand.

Wet lens diameter and basecurve are measured on an Optimec JCF contact lens analyser fitted with a TC20 temperature control unit set at 21° C. on a minimum of 25 lenses per run.

Lens wet centre thickness is measured using a Rehder ET-3 electronic thickness gauge.

Surface quality was determined subjectively by inspecting the lens in a wet cell using a documator manufactured by Carl Zeis, with the lens image projected onto a screen with a magnification of ×17.5.

Haze was assessed subjectively by viewing wet lenses in a wet cell on a documator. The documator is a device which illuminates the lenses from underneath, and allows the lenses to be observed at approximately 45° to the light source to enable haze to be observed. A value of 5 indicates a completely opaque lens, and a level of 0 indicates no discernable haze. The values shown indicate the average of several assessments. On occasions where haze was seen in dry lenses, which are lenses prior to extraction and hydration on immediate removal from the moulds, this was recorded as such. Materials with haze values greater than 2 are unlikely to be viable as contact lens materials, as it is likely that at these levels of haze that the optical performance of the lens will be compromised. This may be reported as halos around bright lights, poor night vision, poor low light visual acuity, or poor vision. Preferably the level of haze should be less than 1.5, more preferably less than 1, and most preferably less than 0.5.

Water content measurements are made on either an Atago CL-1 contact lens refractometer or an Index Instruments Contact Lens Refractometer CLR12-70. The Atago refractometer is used by placing a sample lens directly onto the prism, gently clamping the sample with light finger pressure on the daylight plate, and focussing so that the scale can be clearly read. The upper area of the scale appears as a blue band, and the lower screen appears as a white band. Water content can be directly read from the scale at the point where the blue and white bands meet.

The Index refractometer is used by gently placing a lens on the sample holder and closing the lid. After a few seconds the reading stabilises and the result printed. The refractive index reading is converted to a water content using a previously validated equation. Prior to measurement all lenses are gently blotted with lint free tissue to remove excess surface water. Bulk water content may also be measured gravimetrically.

Sessile drop (water in air) and captive bubble (air in water) contact angles were measured using a Dataphysics OCA15 contact angle analyzer with contact lens adaptor. Lenses were equilibrated and measured in borate buffered saline. Measurements were taken on individual lenses removed from the packaging solution and soaked in three changes of surfactant free borate buffered saline over a 24 hour period prior to measurement.

The sessile drop contact angle of the lens surface was determined using the following method. Lenses were removed from solution and blotted dry to remove surface water before placing on the sample stage. The image was focused. A borate solution droplet (2·L) was applied to the sample using the OCA15, at a rate of 1·L/second, using a 500·L Data Physics 6000005 precision syringe, fitted with a 51 mm Data Physics 6000007 dosing needle. The image was then magnified and re-focused, and an image captured for analysis of the contact angle. Preferably materials have a sessile drop contact angle of less than 80°, and more preferably less than 70°, and most preferably less than 60°.

Measurements for captive bubble contact angle were taken in borate solution to maintain lens hydration. Each lens was positioned on the sample dome lens holder that was mounted inversely. A curved needle was placed underneath the lens, allowing the adsorption of a 2·L air bubble onto the lens surface at a rate of 1·L/second, using a 500·L Data Physics 6000005 precision syringe whilst the lens and the air from the needle were in direct contact. The needle was then retracted, leaving the air bubble at the apex of the lens. An image was captured and the lens returned to its hydrating solution. Analysis of the images was carried out manually as follows. The curved baseline representing the lens surface was defined manually using SCA 20 software. The outline of the drop/bubble on the lens surface was then also defined using an elliptical drawing tool and the angle between the lens surface baseline and the elliptical fit of the drop/bubble outline measured using the OCA15 software for both sides of the image. A minimum of five samples was measured for each material, and the mean of the five measurements for both sides reported. Preferably materials have a captive bubble contact angle of less than 50°, and more preferably less than 40°, and most preferably less than 35°.

The mechanical properties of a random sample of lenses (−3.00 dioptres±0.25D) from each batch was measured as follows. Lenses were stored in their packaging solution prior to testing. Lenses from the test batches were individually measured for centre thickness. Single strips (approx. 2.1 mm wide) were cut through the diameter of each lens using a jig fitted with fixed spacing razor blades. The lens strips were then mounted in the jaws of a Lloyd Instruments model LRX tensile testing machine, and pulled until failure occurred. Modulus was determined by measuring the slopes of the graphs of load vs. extension, taking the slope during the initial elastic phase of the extension.

Modulus values were calculated using an Excel spreadsheet according to the following equation:

$$\lambda = \frac{\text{stress}}{\text{strain}} = \frac{\frac{F}{A}}{\frac{x}{l}} = \frac{Fl}{Ax}$$

where • is the modulus of elasticity in Pascals, F is the force in Newtons, A is the cross-sectional area of the strip (strip width multiplied by thickness) in square meters, x is the extension in meters, and l is the natural, un-stretched length in meters (i.e. the gap between the jaws holding the lens strip). A minimum of 10 lenses were measured for each lens type. The extension to break and stress at break (tensile strength) were also recorded. The modulus should be preferably less than 0.5 Mpa, and more preferably less than 0.3 Mpa. Elongation to break is preferably greater than 120%, more preferably greater than 150% and most preferably greater than 180%.

Oxygen permeability (Dk) was measured using the polarographic method utilising a Rheder $O_2$ Permeometer model 201T and the method described in the international standard ISO 9913-1. As anyone skilled in the art will know, the measurement of Dk is difficult to achieve with high accuracy and precision using this method; for this reason measurements were normalised against an FDA approved predicate device with a Dk within the target range (Acuvue Advance, Vistakon, Dk 60), and the 95% confidence intervals for the measurements are tabulated rather than the mean value. Different sample thicknesses are necessary for the measurement of Dk using this method, and this was achieved by stacking lenses together to a maximum of four lenses. The results quoted are surface and edge corrected. Taking account of the average lens thickness for a typical product of this type, manufacturing tolerances, and the thickness variation across the power range for contact lens products which is typically between −10 dioptres and +10 dioptres, a material requires a minimum Dk of approximately 60 to guarantee that all lenses meet the transmissibility requirement for daily wear Silicone hydrogels are typically less hydrolytically stable than conventional hydrogels, which can result in products made from these materials having shorter shelf life than desired. There are a number of methods for assessing hydrolytic stability. One method is to measure the gravimetric weight loss after storing for 14 days at 80° C. as described in U.S. Pat. No. 5,358,995. Other methods employed for screening formulations for hydrolytic stability are to use multiple autoclave cycles followed by re-measurement of the dimensional properties or the mechanical properties. Also employed are methods using gravimetric weight loss determination or re-measurement of mechanical properties after storage for various time periods at 60° C. as detailed in US Patent Application 2007/0149428.

Hydrolytic stability was assessed by heating the test samples (minimum 25 lenses per run) to 60° C. and by comparing the lens dimensions prior to heating ($T_0$) and after 14 days ($T_{14}$). The average change in lens diameter and base-curve in mm were added together, and the total change (•60° C. $T_0$ to $T_{14}$) graded according to the grouping in table 1. Certain formulations were further assessed for hydrolytic stability by comparing the mechanical properties at $T_0$ with the mechanical properties following storage at 60° C. for 14 days. It has been previously found that formulations which have evidence of poor hydrolytic stability as shown by significant dimensional changes with time can also show changes in mechanical properties. For these formulations, comparison of the mechanical properties at time zero ($T_0$) with the mechanical properties following storage at 60° C. for 14 days ($T_{14}$) typically also show significant differences. This test may be used as a screening method to identify those formulations which are indicated to have poor stability characteristics and those which are indicated to have good stability and are worth progressing through more rigorous stability testing protocols. Lenses with poor stability typically show an increase in the lens modulus and a concomitant decrease in elongation to break values and stress at break values. Without being constrained by theory, this is consistent with an increase in the cross link density of the material. Other materials degrade and show a reduction in the modulus and an increase in elongation to break, which is consistent with a reduction in the cross link density or cleavage of bonds in the polymer backbone of the material. Therefore little or no change in the mechanical properties between $T_0$ data and the $T_{14}$ data at 60° C. is evidence of acceptable material stability. Samples with hydrolytic stability grades higher than 2 are unlikely to produce materials which have acceptable stability for contact lens products. Preferably the hydrolytic stability grade is less than 1.5. More preferably the hydrolytic stability grade is less than 1.0, and most preferably the hydrolytic stability grade is less than 0.5.

TABLE 1

| 60° C. $T_o$ to $T_{14}$ (Dia + BC) less than or equal to (mm) | 0.05 | 0.10 | 0.15 | 0.20 | 0.25 | 0.30 | 0.35 | 0.40 | 0.45 | 0.50 | 0.55 | 0.60 | 0.65 | 0.7 | 0.75 | 0.8 |
|---|---|---|---|---|---|---|---|---|---|---|---|---|---|---|---|---|
| assigned grade | 0.0 | 0.5 | 1.0 | 1.5 | 2.0 | 2.5 | 3.0 | 3.5 | 4.0 | 4.5 | 5.0 | 5.5 | 6.0 | 6.5 | 7.0 | 7.5 |

Materials which show good hydrolytic stability following the above screening tests can then be fully assessed for product stability, methods for carrying out such testing will be familiar to those working the field of materials development for biomedical devices, and for contact lenses are detailed in EN ISO 11987:1997 Ophthalmic optics-contact lenses-determination of shelf life; and the US Food and Drugs Administration (FDA) guidelines for accelerated stability testing.

The components used in producing the contact lenses are as follows:
HEMA—2-hydroxyethyl methacrylate
DMA—N,N-dimethylacrylamide
NVP—N-vinylpyrrolidone
NVA—N-methyl-N-vinylacetamide
DMAEMA—dimethylaminoethyl methacrylate
TEGDMA—tetraethyleneglycol dimethacrylate
F1—linear monomethacryloxypropyl terminated polytrifluoropropylmethylsiloxane
F2—branched monomethacryloxypropyl terminated polytrifluoropropylmethylsiloxane
MA-PDMS—3-methacryloxypropyldimethyl siloxane
TRIS—tris(trimethylsilyloxy)silylpropyl methacrylate
n-PrOH—n-propanol
EtOH—ethanol
EtAc—ethyl acetate

TABLE 2

| | Example | | | | | |
|---|---|---|---|---|---|---|
| | Example 1 wt % | Example 2 wt % | Example 3 wt % | Example 4 wt % | Example 5 wt % | Example 6 wt % |
| HEMA | 6.60 | 6.60 | 4.70 | 4.70 | 6.58 | 6.58 |
| DMA | 5.24 | 5.24 | 3.78 | 3.78 | 15.72 | 15.72 |

TABLE 2-continued

| | | | | | | |
|---|---|---|---|---|---|---|
| NVP | 47.13 | 47.13 | 33.73 | 33.73 | 36.67 | 36.67 |
| TEGDMA | 1.01 | 1.01 | 0.84 | 0.84 | 1.02 | 1.02 |
| F1 | 19.96 | 19.96 | 35.82 | 35.82 | 19.95 | 19.95 |
| MA-PDMS | 0.00 | 0.00 | 10.58 | 10.58 | 0.00 | 0.00 |
| Tris | 20.07 | 20.07 | 10.56 | 10.56 | 20.06 | 20.06 |
| n-PrOH | 0.00 | 16.50 | 0.00 | 11.10 | 0.00 | 16.50 |
| Demoulding Score | 1 | 2 | 5 | 5 | 1 | 2 |
| Haze Score | 1 | 2 | 1 | 2 | 1 | 1 |
| % Water | 61.0 | 63.0 | 51.7 | 54.9 | 61.9 | 60.8 |
| Modulus at $T_0$ | 0.35 | 0.29 | — | — | 0.33 | 0.27 |
| Ext. to Break at $T_0$ | 2.85 | 3.70 | — | — | 2.65 | 2.90 |
| Captive Bubble CA° | 30 | — | — | — | 35 | 29 |
| Sessile Drop CA° | 52 | 44 | — | — | 99 | 97 |
| 60° C. Stability Score | 2 | 1 | — | — | 0.5 | 0 |
| Dk (barrers) | 39-50 | 39-49 | — | — | — | — |

| | Example | | | | |
|---|---|---|---|---|---|
| | Example 7 wt % | Example 8 wt % | Example 9 wt % | Example 10 wt % | Example 11 wt % |
| HEMA | 6.61 | 6.61 | 6.32 | 6.32 | 5.87 |
| DMA | 26.30 | 26.30 | 5.00 | 5.00 | 4.63 |
| NVP | 26.14 | 26.14 | 44.96 | 44.96 | 41.70 |
| TEGDMA | 0.97 | 0.97 | 0.51 | 0.51 | 0.93 |
| F1 | 19.94 | 19.94 | 24.04 | 24.04 | 29.00 |
| MA-PDMS | 0.00 | 0.00 | 0.00 | 0.00 | 8.92 |
| Tris | 20.04 | 20.04 | 19.16 | 19.16 | 8.94 |
| n-PrOH | 0.00 | 16.50 | 0.00 | 16.50 | 3.17 |
| Demoulding Score | 1 | 2 | 2 | 4 | 1 |
| Haze Score | 1 | 2 | 2 | 3 | 1 |
| % Water | 59.7 | 61.0 | 62.0 | 65.0 | 58.0 |
| Modulus at $T_0$ | 0.30 | 0.27 | — | 0.26 | 0.51 |
| Ext. to Break at $T_0$ | 2.9 | 3.2 | — | 2.9 | 1.8 |
| Captive Bubble CA° | 31 | 28 | 27 | 34 | 30 |
| Sessile Drop CA° | 105 | 108 | 65 | 55 | 53 |
| 60° C. Stability Score | 1.5 | 1.5 | 0.5 | | 2.5 |
| Dk (barrers) | — | — | 57-71 | 50-64 | >70 |

Table 2 shows the formulations and results for lots made with combinations of NVP and DMA, both with and without n-propanol as a solvent. With the exception of examples 3 and 4 all lenses produced sufficient samples for further testing. Examples 3 and 4 only yielded sufficient lenses for the lens dimensions and water content to be assessed as the demoulding yield was extremely poor as indicated by the high score for this parameter.

This could be due to the significantly higher proportion of silicone containing monomers in the formulation.

Although there is continuing debate regarding the acceptable values for oxygen permeability and lens transmissibility for daily wear modality lenses, the values most often quoted are those of Holden and Mertz (Holden B A, Mertz G W. Critical oxygen levels to avoid corneal oedema for daily and extended wear lenses. *Invest Opthalmol V is Sci*, 1984; 25: 1161-1167) and for daily wear the lowest acceptable transmissibility is 24 barrers. Taking into account manufacturing tolerances and thickness variation across the lens due to the design, and assuming a maximum average thickness of 0.25 mm, a Dk of approximately 55 is therefore the minimum value required to ensure that the transmissibility value of 24 is met across the whole of the lens. It is clear therefore that Examples 1 and 2 are below this level of 55 barrers required for oxygen permeability, and are therefore not preferred.

Examples 5 to 8 have proportionally higher levels of DMA, which results in a higher sessile drop measurement. Although the captive bubble measurement remains low, it has been found that lenses with high sessile drop measurements typically do not perform well in on-eye trials, and often show poor in-vivo wettability or high levels of deposition.

Examples 9 and 11 have properties within the preferred ranges for all parameters. Examples 10, which is identical to example 9 with the addition of 16.5 g n-propanol solvent per 100 g monomer mix shows a significantly poor demoulding score and increased and unacceptably high haze levels. Higher haze levels are typical with the addition of solvent to formulation in this range of trials, and in all cases the demoulding score is higher with the solvent formulation than the corresponding formulation with no solvent.

TABLE 3

| | Example | | | |
|---|---|---|---|---|
| | Example 12 wt % | Example 13 wt % | Example 14 wt % | Example 15 wt % |
| HEMA | 6.03 | 6.03 | 6.07 | 6.07 |
| DMA | 4.79 | 4.79 | 4.79 | 4.79 |
| NVP | 42.85 | 42.85 | 42.90 | 42.90 |
| TEGDMA | 0.52 | 0.52 | 0.47 | 0.47 |
| F1 | 27.50 | 27.50 | 27.53 | 27.53 |
| MA-PDMS | — | — | — | — |
| Tris | 18.30 | 18.30 | 18.25 | 18.25 |
| n-PrOH | — | 16.50 | — | — |
| EtOH | — | — | 16.50 | — |
| EtAc | — | — | — | 16.50 |
| Demoulding Score | 1 | 5 | 5 | 3 |
| Haze Score | 2 | — | — | 2.5 |
| % Water | 61.0 | — | — | — |
| Modulus at $T_0$ | 0.3 | — | — | — |
| Ext. to Break at $T_0$ | 370% | — | — | — |
| Captive Bubble CA ° | 30 | — | — | — |
| Sessile Drop CA ° | 64 | — | — | — |

TABLE 3-continued

| | Example 12 wt % | Example 13 wt % | Example 14 wt % | Example 15 wt % |
|---|---|---|---|---|
| 60° C. Stability Score | 0.5 | — | — | — |
| Dk (barrers) | 56-81 | — | — | — |

Table 3 shows the effect of varying solvents on NVP/DMA based formulations. Example 12 contains no solvents and has parameters within the desired ranges. Addition of n-propanol or ethanol at 16.5 g solvent per 100 g monomer (examples 13 and 14) results in lenses which are extremely difficult to demould. Example 15 with the addition of ethyl acetate at 16.5 g solvent per 100 g monomer produced lenses which were easier to demould but have high haze. Therefore it can be seen that the use of different solvents all result in lenses which have poorer demould and haze properties than a corresponding lens made without solvent.

TABLE 4

| Reagents | Example 16 wt % | Example 17 wt % | Example 18 wt % | Example 19 wt % | Example 20 wt % |
|---|---|---|---|---|---|
| HEMA | 6.01 | 6.01 | 6.30 | 6.01 | 6.01 |
| NVP | 47.72 | 47.72 | 49.98 | — | — |
| NVA | — | — | — | 47.72 | 47.72 |
| TEGDMA | 0.46 | 0.46 | 0.52 | 0.46 | 0.46 |
| F1 | 27.52 | 27.52 | 33.60 | 27.55 | 27.55 |
| Tris | 18.30 | 18.30 | 9.61 | 18.27 | 18.27 |
| n-PrOH | — | 16.50 | — | — | 16.50 |
| Demoulding Score | 3 | 3 | 1 | 1 | 1 |
| Haze Score | 2.5 | 3.5 | 2 | 2.5 | 3.5 |
| % Water | 58.0 | 63.0 | 61.0 | 65.3 | 63.2 |
| Modulus at $T_0$ | 0.43 | — | 0.37 | 0.35 | — |
| Ext. to Break at $T_0$ | 3.30 | — | 3.00 | 3.60 | — |
| Captive Bubble CA ° | 29 | — | 32 | 25 | — |
| Sessile Drop CA ° | 47 | — | 28 | 21 | — |
| 60° C. Stability Score | 0.0 | — | 1.5 | 2.0 | — |
| Dk (barrers) | — | — | 62-70 | — | — |

The data in Table 4 show formulations and the corresponding data for examples containing either NVP or NVA with no DMA. Again the addition of solvent to these formulations shows a significant increase in haze in all cases. Due to the high level of haze in these solvent formulations no further data was collected. Haze was generally higher in all of these formulations than the formulations in Table 2, with the exception of Example 18 with no solvent added, which meets the requirements for all parameters measured. The use of NVA instead of NVP in a formulation with no DMA shows improved demould but lower stability.

TABLE 5

| Reagents | Example 21 wt % | Example 22 wt % | Example 23 wt % | Example 24 wt % | Example 25 wt % |
|---|---|---|---|---|---|
| HEMA | 6.65 | 6.65 | 5.99 | 5.99 | 6.03 |
| DMAEMA | 5.25 | 5.25 | 4.84 | 4.84 | 4.78 |
| NVP | — | — | — | — | 42.92 |
| NVA | 47.26 | 47.26 | 42.89 | 42.89 | — |
| TEGDMA | 0.50 | 0.50 | 0.52 | 0.52 | 0.47 |
| F1 | 20.22 | 20.22 | 27.50 | 27.50 | 27.52 |
| Tris | 20.12 | 20.12 | 18.25 | 18.25 | 18.29 |
| n-PrOH | — | 16.50 | — | 16.50 | — |
| Demoulding Score | 1 | 2.5 | 1 | 5 | 1 |
| Haze Score | 1 | 3 | 1 | — | 2 |
| % Water | 68.6 | 65.1 | 65.5 | — | 60.0 |
| Modulus at $T_0$ | 0.30 | — | 0.33 | — | 0.34 |
| Ext. to Break at $T_0$ | 3.4 | — | 3.2 | — | 2.9 |
| Captive Bubble CA ° | 28 | — | 28 | — | 29 |
| Sessile Drop CA ° | 25 | — | 24 | — | 55 |
| 60° C. Stability Score | 7 | — | 6 | — | 3 |
| Dk (barrers) | 58-68 | — | 52-62 | — | 68-76 |

The data in Table 5 shows examples containing NVA and DMAEMA, with one example (example 25) containing NVP and DMAEMA. Example 21 has acceptable values for all parameters with the exception of the stability score, which is very poor. Corresponding example 22 with solvent added again shows an increase in haze and poorer demoulding score typical of the solvent formulations. Example 23 similarly has very poor stability, and the corresponding solvent formulation example 24 had a very poor yield at demoulding (high demould score) and was not tested further. Example 25 has better stability than the corresponding NVA trials, but has poor stability compared to the NVP/DMA examples in Table 2.

TABLE 6

| | Example 1 | Example 6 | Example 12 | Example 23 |
|---|---|---|---|---|
| Modulus at $T_0$ | 0.35 | 0.27 | 0.30 | 0.33 |
| Ext. to Break at $T_0$ | 285% | 290% | 370% | 320% |
| 60° C. Stability Score | 2 | 0 | 0.5 | 6 |
| 60° C. Modulus @ $T_{14}$ | 0.41 | 0.25 | 0.29 | 0.38 |
| 60° C. Ext to Break @ $T_{14}$ | 280% | 300% | 360% | 220% |
| % Change in Modulus | 17.1% | −7.4% | −3.3% | 15.2% |
| % Change in Ext to Break | −1.8% | 3.4% | −2.7% | −31.3% |

Further stability testing was done on the lots detailed in Table 6 by comparing the mechanical properties after storage at 60° C. with the $T_0$ data as previously described. There is a reasonable correlation between the stability assessment score based on the dimensional data and the percent change in the modulus and elongation to break of the materials. Material which showed poor stability in the dimensional assessment typically showed significant changes to either the modulus or extension to break (Example 1), or in the case of Example 23 both parameters.

Examples 12 (Table 3), 18 (Table 4) and 23 (Table 5) were evaluated on eye. All were found to have good wettability and lens movement, and did not induce any immediate adverse reactions such as stinging or redness.

TABLE 7

| | Example 26 wt % | Example 27 wt % | Example 28 wt % | Example 29 wt % | Example 30 wt % |
|---|---|---|---|---|---|
| HEMA | 6.29 | 5.75 | 4.89 | 4.43 | 3.96 |
| DMA | — | — | — | — | — |
| NVP | 49.96 | 45.61 | 38.82 | 35.14 | 31.44 |
| TEGDMA | 0.48 | 0.44 | 0.49 | 0.49 | 0.49 |
| F2 | 33.65 | 30.72 | 50.00 | 53.43 | 56.65 |
| MA-PDMS | — | — | — | — | — |
| Tris | 9.61 | 19.91 | 9.36 | 10.08 | 11.02 |
| n-PrOH | — | — | — | — | — |

TABLE 7-continued

| | Example 26 wt % | Example 27 wt % | Example 28 wt % | Example 29 wt % | Example 30 wt % |
|---|---|---|---|---|---|
| EtOH | — | — | — | — | — |
| EtAc | — | — | — | — | — |
| Demoulding Score | 1 | 1 | 4 | 5 | 5 |
| Haze Score | 2 | 2 | — | — | — |
| % Water | 57.5 | 55.3 | — | — | — |
| Modulus at $T_0$ | 0.34 | 0.37 | — | — | — |
| Ext. to Break at $T_0$ | 400% | 400% | — | — | — |
| Captive Bubble CA ° | — | 27 | — | — | — |
| Sessile Drop CA ° | — | 29 | — | — | — |
| 60° C. Stability Score | — | — | — | — | — |
| Dk (barrers) | — | 37-42 | — | — | — |

Table 7 illustrate limitations to increasing loading of F2 insofar as demoulding is concerned; lenses were not processed further.

TABLE 8

| Reagents | Example 31 wt % | Example 32 wt % |
|---|---|---|
| HEMA | 5.14 | 7.53 |
| NVP | 40.80 | 38.43 |
| NVA | — | — |
| TEGDMA | 0.50 | 0.48 |
| F2 | 33.58 | 33.58 |
| Tris | 19.97 | 19.97 |
| n-PrOH | — | — |
| Demoulding Score | 2 | 2 |
| Haze Score | 2 | 2 |
| % Water | 52.3 | 52.2 |
| Modulus at $T_0$ | 0.37 | — |
| Ext. to Break at $T_0$ | 350% | — |
| Captive Bubble CA ° | 30 | 33 |
| Sessile Drop CA ° | 79 | 102 |
| 60° C. Stability Score | — | — |
| Dk (barrers) | 55-64 | — |

The foregoing examples demonstrate the difficulties in achieving a balance of all of the required properties of a contact lens material by varying the formulation components and ratios. The inclusion of non-reactive solvents or diluents in the formulation to mitigate the effects of the formulation choices made to best optimise all of the material properties, or the use of solvent extraction processes as part of the extraction and hydration process, are both compromises which affect the manufacturing process efficiency and cost. While a number of the prior art references for manufacturing cast moulded lenses have avoided one or the other of these undesirable elements, none have avoided both in unison. The above examples demonstrate that it is possible to produce lenses with the required balance of properties for a successful contact lens product without the use of either a solvent in the formulation and the use of an exclusively aqueous extraction and hydration process. This is achieved by utilising particular fluorinated silicone containing materials, and results in improving the cost and efficiency of production without compromising material properties.

Although the invention has been described with reference to the exemplified preferred embodiments, it will be appreciated that various modifications are possible within the scope of the invention.

The invention claimed is:

1. A method of making a contact lens comprising the steps of:
   a) reacting in a mould a polymerisable formulation comprising:
      (i) at least one fluorine-containing silicone monomer having the formula

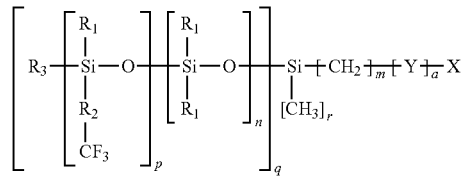

where X is a polymerisable group, each $R_1$ is independently a $C_{1-6}$ alkyl group or an $R_4$—$CF_3$ group, wherein $R_4$ is independently a $C_{1-6}$ alkenyl group, each $R_2$ is independently a $C_{1-6}$ alkenyl group, or a fluorine-containing $C_{1-6}$ alkenyl group, $R_3$ is a monovalent linear or branched alkyl group, a siloxane chain comprising from 1 to 30 Si—O units, a phenyl group, a benzyl group, a linear or branched heteroatom containing group or a combination thereof, m is 1 to 6, n is 0 to 14, and p is 1 to 14, and n+p is ≤15, Y is a divalent linking group and a is 0 or 1, wherein q is from 1 to 3 and r is 3-q;
      (ii) at least one non-fluorine-containing silicone monomer; and
      (iii) at least one hydrophilic monomer to form a contact lens; and
   b) subjecting the contact lens to one or more solvent extraction steps to remove impurities, oligomers and unreacted monomers and hydrate the contact lens, wherein all of the solvent extraction steps are undertaken using an aqueous solvent.

2. A method as claimed in claim 1, wherein the total amount of component (i) is at least 20 weight percent of the total formulation and the total amount of components (i) and (ii) is less than 50 weight percent of the total formulation.

3. A method as claimed in claim 1 additionally comprising at least one cross-linker.

4. A method as claimed in claim 1 additionally comprising a non-silicon containing hydrophobic monomer.

5. A method as claimed in claim 1, wherein the hydrophilic monomer comprises one or more of N-vinyl pyrrolidone, N-methyl-N-vinyl acetamide, N,N-dimethylacrylamide and 2-hydroxyethylmethacrylate.

6. A method as claimed in claim 1, wherein N,N-dimethylacrylamide is present in an amount of from 3 to 10 weight percent.

7. A method as claimed in claim 1, wherein the non-fluorine containing silicone monomer comprises tris(trimethylsilyloxy)silylpropylmethacrylate.

8. A method as claimed in claim 1, wherein q is 1 or 2.

9. A method as claimed in claim 1, wherein the fluorine containing silicone monomer comprises:

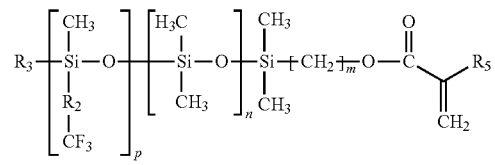

wherein each $R_2$ is independently a $C_{1-6}$ alkenyl group or a fluorine containing $C_{1-6}$ alkenyl group, $R_3$ is a monovalent alkyl group, $R_5$ is H or $CH_3$, m is 1 to 6, n is 0 to 14, and p is 1 to 14, and n+p is ≤15.

10. A solvent-free polymerisable formulation, the formulation comprising:
(i) at least one fluorine-containing silicone monomer having the formula

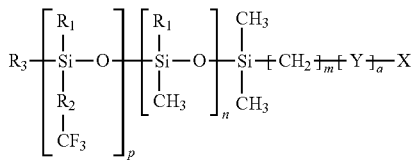

where X is a polymerisable group, each $R_1$ is independently a $C_{1-6}$ alkyl group or an $R_4$—$CF_3$ group, wherein $R_4$ is independently a $C_{1-6}$ alkenyl group, each $R_2$ is independently a $C_{1-6}$ alkenyl group, or a fluorine-containing $C_{1-6}$ alkenyl group, $R_3$ is a monovalent linear or branched alkyl group, a siloxane chain comprising from 1 to 30 Si—O units, a phenyl group, a benzyl group, a linear or branched heteroatom containing group or a combination thereof, m is 1 to 6, n is 0 to 14, and p is 1 to 14, and n+p is ≤15, Y is a divalent linking group and a is 0 or 1;
(ii) at least one non-fluorine-containing silicone monomer; and
(iii) at least one hydrophilic monomer, wherein the total amount of component (i) is at least 20 weight percent of the total formulation and the total amount of components (i) and (ii) is less than 50 weight percent of the total formulation.

11. A polymerisable formulation comprising:
(i) from 20 to 35 weight percent of at least one fluorine-containing silicone monomer having the formula:

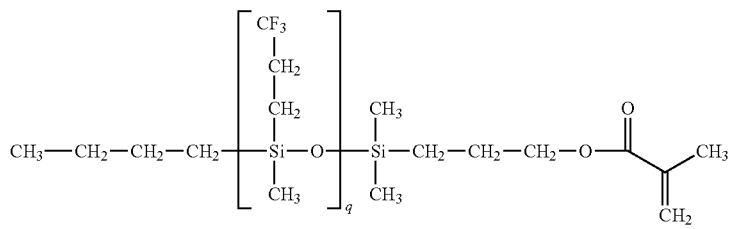

wherein n is from 1 to 10;
(ii) from 15 to 35 weight percent of at least one non-fluorine containing silicone monomer;
(iii) from 25 to 60 weight percent N-vinyl pyrrolidone or N-methyl-N-vinyl acetamide; and
(iv) from 2 to 10 weight percent 2-hydroxyethyl methacrylate, wherein the total amount of components (i) and (ii) is less than 50 weight percent.

12. A polymerisable formulation comprising:
(i) from 20 to 35 weight percent of at least one fluorine-containing silicone monomer having the formula:

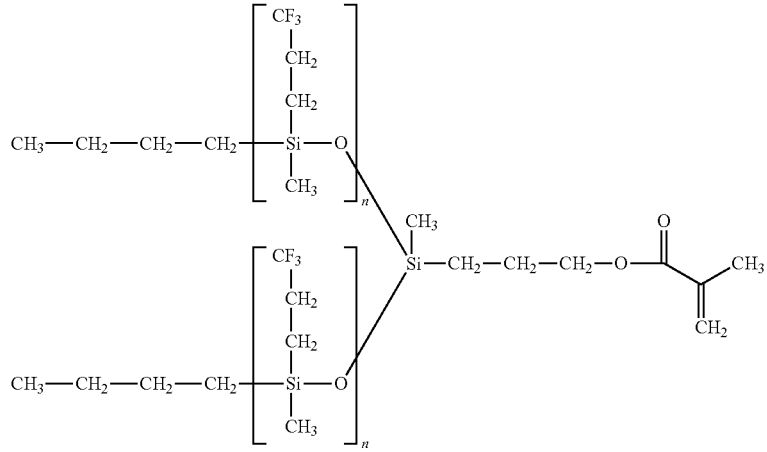

wherein each n is independently from 1 to 10;
(ii) from 8 to 35 weight percent of at least one non-fluorine containing silicone monomer;
(iii) from 25 to 60 weight percent N-vinyl pyrrolidone or N-methyl-N-vinyl acetamide; and
(iv) from 2 to 10 weight percent 2-hydroxyethyl methacrylate, wherein the total amount of components (i) and (ii) is less than 55 weight percent.

13. A method as claimed in claim 1, wherein X is selected from the group consisting of an acrylate, methacrylate, acrylamide and a methacrylamide, each $R_1$ is independently a $C_{1-6}$ alkyl group, each $R_2$ is independently a $C_{1-6}$ alkenyl group, $R_3$ is a monovalent linear or branched alkyl group or a siloxane chain comprising from 1 to 30 Si—O units, n is 0 to 7, and p is 1 to 10, and a is 0 and q is 1.

14. A method as claimed in claim 1, wherein X is selected from the group consisting of an acrylate, methacrylate, acrylamide and a methacrylamide, each $R_1$ is independently a $C_{1-6}$ alkyl group, each $R_2$ is independently a $C_{1-6}$ alkenyl group, or a fluorine-containing $C_{1-6}$ alkenyl group, $R_3$ is a monovalent linear or branched alkyl group or a siloxane chain comprising from 1 to 30 Si—O units, m is 1 to 6, n is 0 to 14, and p is 1 to 14, and n+p is ≤15, Y is a divalent linking group and a is 0 or 1, wherein q is from 1 to 3 and r is 3-q.

15. A method as claimed in claim 1, wherein the polymerisable formulation comprises:
(i) from 20 to 35 weight percent of at least one fluorine-containing silicone monomer having the formula:

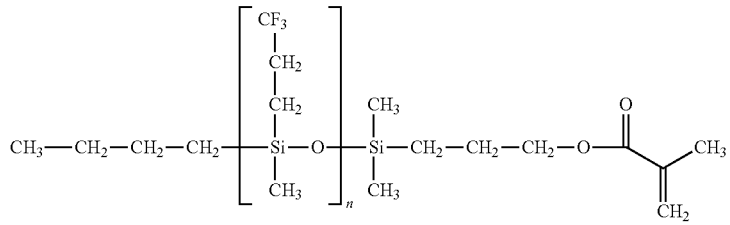

wherein n is from 1 to 10;
(ii) from 15 to 35 weight percent of at least one non-fluorine containing silicone monomer;
(iii) from 25 to 60 weight percent N-vinyl pyrrolidone or N-methyl-N-vinyl acetamide; and
(iv) from 2 to 10 weight percent 2-hydroxyethyl methacrylate, wherein the total amount of components (i) and (ii) is less than 50 weight percent.

16. A method as claimed in claim 1, wherein the polymerisable formulation comprises:
(i) from 20 to 35 weight percent of at least one fluorine-containing silicone monomer having the formula:

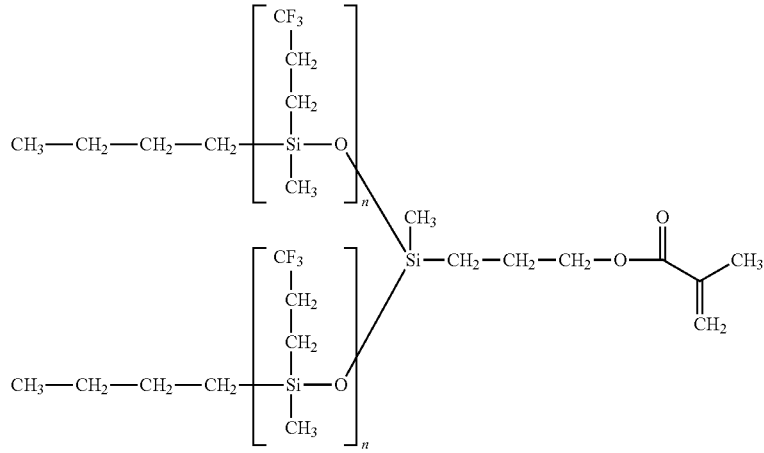

wherein each n is independently from 1 to 10;
(ii) from 8 to 35 weight percent of at least one non-fluorine containing silicone monomer;
(iii) from 25 to 60 weight percent N-vinyl pyrrolidone or N-methyl-N-vinyl acetamide; and
(iv) from 2 to 10 weight percent 2-hydroxyethyl methacrylate, wherein the total amount of components (i) and (ii) is less than 55 weight percent.

* * * * *